US011727166B2

(12) United States Patent
Benjamin et al.

(10) Patent No.: US 11,727,166 B2
(45) Date of Patent: Aug. 15, 2023

(54) TECHNIQUES FOR GENERATING GRAPH-BASED REPRESENTATIONS OF COMPLEX MECHANICAL ASSEMBLIES

(71) Applicant: AUTODESK, INC., San Francisco, CA (US)

(72) Inventors: David Benjamin, New York, NY (US); James Stoddart, New York, NY (US); Danil Nagy, New York, NY (US); Damon Lau, New York, NY (US)

(73) Assignee: AUTODESK, INC., San Francisco, CA (US)

( * ) Notice: Subject to any disclaimer, the term of this patent is extended or adjusted under 35 U.S.C. 154(b) by 255 days.

(21) Appl. No.: 16/405,761

(22) Filed: May 7, 2019

(65) Prior Publication Data
US 2019/0347373 A1 Nov. 14, 2019

Related U.S. Application Data

(60) Provisional application No. 62/668,735, filed on May 8, 2018.

(51) Int. Cl.
G06F 16/90 (2019.01)
G06F 30/17 (2020.01)
(Continued)

(52) U.S. Cl.
CPC .......... *G06F 30/17* (2020.01); *G06F 3/04815* (2013.01); *G06F 16/9024* (2019.01);
(Continued)

(58) Field of Classification Search
None
See application file for complete search history.

(56) References Cited

U.S. PATENT DOCUMENTS 5,995,110 A 11/1999 Litwinowicz
6,844,877 B1 1/2005 Rajkumar et al.
(Continued)

OTHER PUBLICATIONS

Non-Final Office Action received for U.S. Appl. No. 16/405,772, dated Mar. 24, 2021, 21 pages.
(Continued)

*Primary Examiner* — Craig C Dorais
(74) *Attorney, Agent, or Firm* — Artegis Law Group, LLP

(57) ABSTRACT

A design analysis engine analyzes a CAD assembly to generate a topological model. The topological model is a graph of nodes coupled together via a set of edges. Each node represents a different CAD model in the CAD assembly and each edge represents a different connection between two such CAD models. The design analysis engine also analyzes the CAD assembly to generate a data model corresponding to the topological model. The data model is a structured dataset that includes component entries and connection entries. A component entry includes design data associated with a CAD model in the CAD assembly and a connection entry includes design data associated with a physical or logical connection between two or more such CAD models. A user interacts with the topological model to navigate the CAD assembly, obtain CAD model data, and initiate automatically-performed design tasks.

20 Claims, 10 Drawing Sheets

(51) Int. Cl.
  *G06F 3/04815* (2022.01)
  *G06F 16/901* (2019.01)
  *G06F 30/20* (2020.01)
  *G06F 3/04845* (2022.01)
  *G06F 3/0482* (2013.01)
  *G06F 3/04847* (2022.01)
  *G06F 111/02* (2020.01)
  *G06F 111/20* (2020.01)

(52) U.S. Cl.
  CPC ............ *G06F 30/20* (2020.01); *G06F 3/0482* (2013.01); *G06F 3/04845* (2013.01); *G06F 3/04847* (2013.01); *G06F 2111/02* (2020.01); *G06F 2111/20* (2020.01)

(56) References Cited

U.S. PATENT DOCUMENTS

| | | | |
|---|---|---|---|
| 7,499,845 | B1 | 3/2009 | Quincy et al. |
| 7,620,947 | B2 | 11/2009 | Krishnaswamy |
| 8,798,975 | B2 | 8/2014 | Rameau et al. |
| 10,318,094 | B2 | 6/2019 | Chen et al. |
| 10,319,094 | B1 | 6/2019 | Chen et al. |
| 2001/0055013 | A1 | 12/2001 | Fuki |
| 2004/0148145 | A1 | 7/2004 | Chen et al. |
| 2005/0229136 | A1 | 10/2005 | Yuda et al. |
| 2006/0052892 | A1 | 3/2006 | Matsushima et al. |
| 2006/0242606 | A1 | 10/2006 | Lin |
| 2008/0234991 | A1 | 9/2008 | Axling et al. |
| 2009/0231334 | A1 | 9/2009 | Chen et al. |
| 2010/0060635 | A1 | 3/2010 | Corcoran et al. |
| 2011/0098982 | A1 | 4/2011 | Artur et al. |
| 2011/0137620 | A1 | 6/2011 | Kawabe et al. |
| 2013/0321415 | A1 | 12/2013 | Itabayashi et al. |
| 2013/0339810 | A1 | 12/2013 | Shimizu |
| 2015/0046893 | A1 | 2/2015 | Demircan et al. |
| 2015/0142400 | A1 | 5/2015 | Matov et al. |
| 2015/0294036 | A1 | 10/2015 | Bonner |
| 2016/0004694 | A1 | 1/2016 | Cornaby |
| 2016/0048293 | A1 | 2/2016 | Chen |
| 2016/0063174 | A1 | 3/2016 | Rameau |
| 2016/0098494 | A1 | 4/2016 | Webster et al. |
| 2016/0116911 | A1* | 4/2016 | Yamamoto .......... G06F 16/9024 700/98 |
| 2016/0147911 | A1 | 5/2016 | Bergin et al. |
| 2016/0306908 | A1 | 10/2016 | Fontes et al. |
| 2017/0066092 | A1 | 3/2017 | Yamamoto |
| 2017/0357406 | A1 | 12/2017 | Yi et al. |
| 2018/0025484 | A1 | 1/2018 | Burton |
| 2019/0087964 | A1 | 3/2019 | Chen et al. |
| 2019/0179510 | A1* | 6/2019 | Kritzler .................. G06F 3/011 |
| 2019/0244114 | A1 | 8/2019 | Nonclercq et al. |

OTHER PUBLICATIONS

Final Office Action received for U.S. Appl. No. 16/405,772, dated Oct. 1, 2021, 13 pages.
Non Final Office Action received for U.S. Appl. No. 16/405,772 dated Jan. 25, 2022, 16 pages.
Final Office Action received for U.S. Appl. No. 16/405,772 dated May 31, 2022, 16 pages.
Non Final Office Action received for U.S. Appl. No. 16/405,772 dated Sep. 21, 2022, 13 pages.
Final Office Action received for U.S. Appl. No. 16/405,772 dated Feb. 7, 2023, 21 pages.
Non Final Office Action received for U.S. Appl. No. 16/405,772 dated May 24, 2023, 19 pages.

* cited by examiner

TECHNIQUES FOR GENERATING GRAPH-BASED REPRESENTATIONS OF COMPLEX MECHANICAL ASSEMBLIES

CROSS-REFERENCE TO RELATED APPLICATIONS

This application claims the priority benefit of United States provisional patent application titled, "Techniques for Generating Graph-Based Representations of Complex Mechanical Assemblies," filed on May 8, 2018 and having Ser. No. 62/668,735. The subject matter of this related application is hereby incorporated herein by reference.

BACKGROUND

Field of the Various Embodiments

Embodiments of the present invention relate generally to computer-aided design technology and, more specifically, to techniques for generating graph-based representations of complex mechanical assemblies.

Description of the Related Art

In a typical mechanical engineering design workflow, a designer uses a computer-aided design (CAD) application to generate CAD models that represent mechanical components. A given CAD model usually includes three-dimensional (3D) design geometry that defines the structure of the corresponding mechanical component(s). For example, a given CAD model could include a triangulated mesh that represents an automobile crankshaft.

The designer also can use the CAD application to combine two or more CAD models to generate a CAD assembly. A given CAD assembly typically includes 3D design geometry associated with at least two CAD models and also includes additional design data indicating how the CAD models are coupled together. For example, a given CAD assembly associated with an automobile could include a first triangulated mesh that represents a chassis and a second triangulated mesh that represents a crankshaft. The CAD assembly could further include design data indicating how the crankshaft is coupled to the chassis. In practice, designers oftentimes use CAD applications to generate complex CAD assemblies composed of thousands of CAD models coupled together in numerous different ways.

One drawback of the above design approach is that complex CAD assemblies can be quite difficult for designers to navigate. Consequently, a designer can have difficulty locating specific CAD models that are positioned deep within a complex CAD assembly, which can hinder the ability of the designer to perform various design tasks, such as analyzing CAD model properties, executing CAD model simulations, identifying underperforming CAD models, and redesigning underperforming CAD models, among others. When these types of design tasks cannot be performed efficiently, the overall design process can become cumbersome and slow.

As the foregoing illustrates, what is needed in the art are more effective techniques for navigating complex CAD assemblies.

SUMMARY

Various embodiments include computer-implemented method for analyzing computer-aided design (CAD) assemblies, the including generating a first mapping between a set of topological elements included in a topological model of a CAD assembly, a set of CAD elements included in the CAD assembly, and a set of data elements included in a data model, receiving a first user interaction via a first topological element included in the set of topological elements, and based on the first mapping, generating a first user interface element that includes a first CAD element that is derived from the set of CAD elements and a first data element that is derived from the set of data elements.

At least one technological advantage of the disclosed techniques relative to the prior art is that complex CAD assemblies can be navigated automatically and efficiently. Accordingly, design data associated with specific CAD models within complex CAD assemblies can be extracted and quickly provided to users, thereby expediting the design process.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
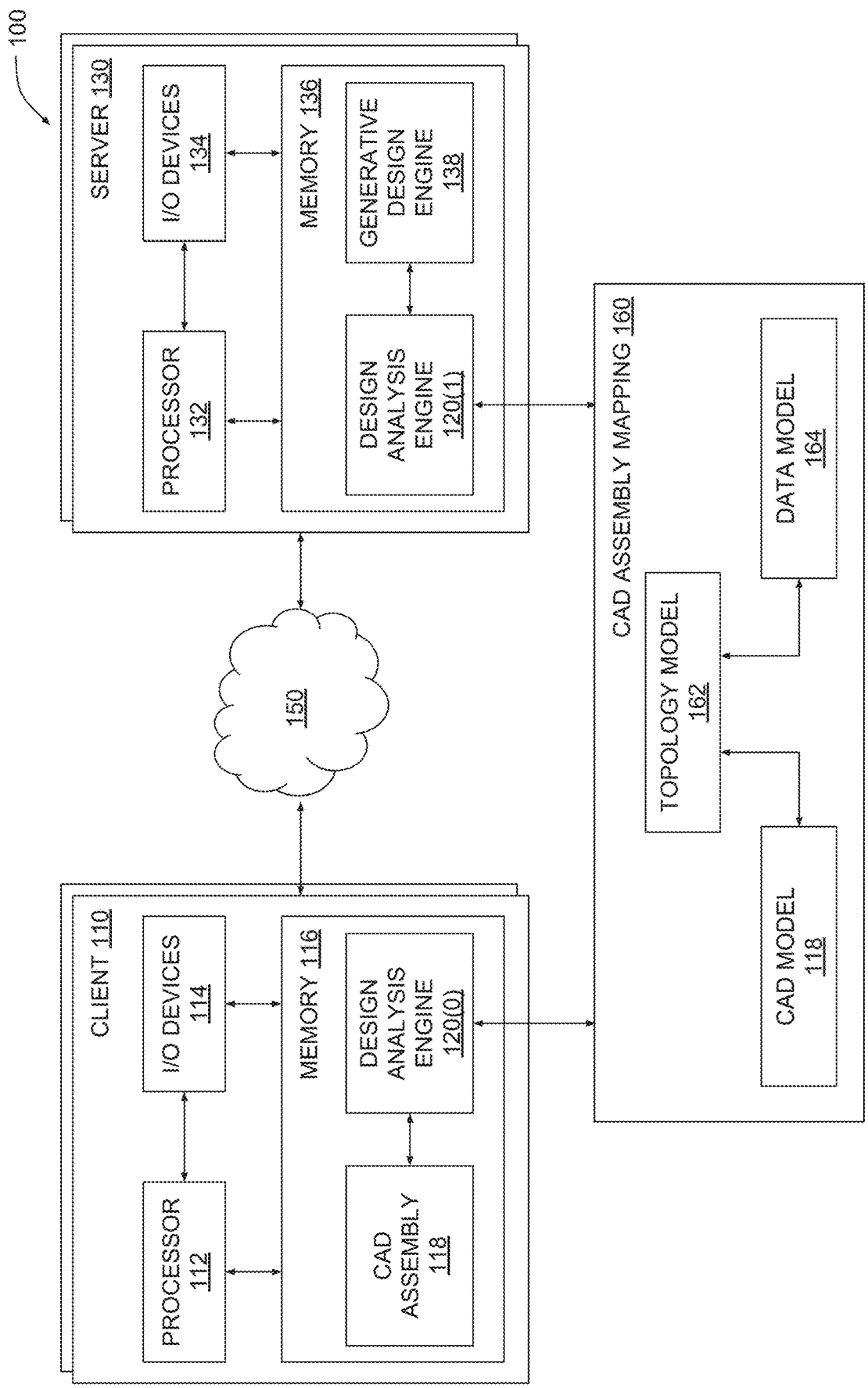
FIG. 1 illustrates a system configured to implement one or more aspects of the present invention.

In the following description, numerous specific details are set forth to provide a more thorough understanding of the various embodiments. However, it will be apparent to one skilled in the art that the inventive concepts may be practiced without one or more of these specific details.

As noted above, complex CAD assemblies can be difficult to navigate, which can interfere with the ability of designers to quickly and easily locate specific CAD models within such assemblies. Consequently, designers oftentimes cannot easily perform various design tasks with CAD models that reside within complex CAD assemblies.

To address these issues, various embodiments include a design analysis engine that analyzes a CAD assembly to generate a topological model. The topological model is a graph of nodes coupled together via a set of edges. Each node represents a different CAD model and each edge represents a different relationship between two CAD models (also referred to as a CAD relationship). The design analysis engine also analyzes the CAD assembly to generate a data model that corresponds to the topological model.

The data model is a structured dataset that includes component entries and connection entries. A component entry includes design data associated with a CAD model that is included in the CAD assembly. A connection entry includes design data associated with a physical or logical connection between CAD models that are included in the CAD assembly. Each node of the topological model corresponds to a different component entry in the data model. Each edge of the topological model corresponds to a different connection entry in the data model.

CAD models and/or CAD relationships may be generally referred to herein as "CAD elements." Nodes and/or edges of a topological model may be generally referred to herein as "topological elements." Component entries and/or connection entries may be generally referred to herein as data elements.

The design analysis engine provides various tools that allow a user to efficiently navigate the CAD assembly via the topological model. In particular, the design analysis engine projects the topological model over the CAD assembly and positions each node on the corresponding CAD model. The design analysis engine also projects the edges between nodes over the CAD assembly. The user can select specific nodes or groups of nodes via interactions with the topological model. A given group of nodes could correspond, for example, to a subassembly within the CAD assembly.

In response to a user selection of a node or group of nodes, the design analysis engine analyzes the topological model to identify any nodes connected to the selected node(s). The design analysis engine also queries the data model based on the selected node(s) and/or connected node(s) to extract any component entries or connection entries associated with those nodes. The design analysis engine then displays design data associated with the extracted entries to the user. These techniques allow the user to quickly and efficiently navigate the CAD assembly and obtain information associated with specific CAD models.

The design analysis engine is configured to automatically perform several design tasks with one or more CAD model(s) selected via the topological model in the manner described above. In particular, the design analysis engine is configured to automatically execute a dynamic simulation of the selected CAD model(s) in order to generate simulation results. The design analysis engine is also configured to parameterize the selected CAD model(s) and transmit a parameterized version of the CAD model(s) to a generative design engine. The generative design engine performs a generative design process with the parameterized version of the CAD model(s) to generate alternative geometry for the CAD model(s). The design analysis engine is further configured to modify the topological model to depict critical connections between nodes, thereby indicating potential points of failure that may need to be redesigned.

At least one technological advantage of the disclosed techniques relative to the prior art is that complex CAD assemblies can be navigated automatically. Accordingly, design data associated with specific CAD models within such complex CAD assemblies can be extracted and quickly provided to users. Another technological advantage of the disclosed techniques relative to the prior art is that specific design tasks that depend on one or more CAD models included within a complex CAD assembly can be performed automatically. These techniques are especially useful in mechanical engineering applications where CAD assemblies include thousands of interconnected CAD models that cannot easily be located in order to perform such design tasks. Accordingly, these technological advantages represent one or more technological advancements relative to prior art approaches.

System Overview

FIG. 1 illustrates a system configured to implement one or more aspects of the present invention. As shown, a system 100 includes one or more clients 110 and one or more servers 130 coupled together via a network 150. A given client 110 or a given server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others.

As further shown, a client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a computer-aided design (CAD) assembly 118 and a design analysis engine (design analysis engine) 120(0). CAD assembly 118 includes a set of three-dimensional (3D) CAD models and design data indicating specific physical and/or logical relationships between those CAD models. The design data could indicate, for example, that a specific subset of 3D models are coupled together to form a subassembly. Design analysis engine 120(0) is a software application that, when executed by processor 112, causes processor 112 to interoperate with a corresponding software application that executes on server 130, as described in greater detail below.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes design analysis engine 120(1)

and a generative design engine 138. Design analysis engine 120(1) is a software application that, when executed by processor 132, causes processor 132 to interoperate with design analysis engine 120(0), as mentioned above. Generative design engine 138 is a software application that, when executed by processor 132, performs a generative design process to generate design geometry that meets a set of design criteria.

As a general matter, design analysis engine 120(0) and design analysis engine 120(1) collectively represent separate portions of a distributed software entity that performs any and all of the inventive operations described herein. Thus, for simplicity, design analysis engines 120(0) and 120(1) are collectively referred to hereinafter as design analysis engine 120.

In operation, design analysis engine 120 analyzes CAD assembly 118 to generate a CAD assembly mapping 160 that includes an instance of CAD assembly 118, a topological model 162, and a data model 164. Topological model 162 is a graph-based representation of CAD assembly 118 and represents various physical and/or logical relationships between CAD models and/or sub-assemblies included in CAD assembly 118. Data model 164 is a data structure that includes design data associated with the CAD models(s) and/or design data associated with any physical or logical relationships set forth in CAD assembly 118. Design analysis engine 120 is configured to perform various operations based on CAD assembly mapping 160 and the various models included therein, as described in greater detail below in conjunction with FIG. 2.

Software Overview

Figure 2:
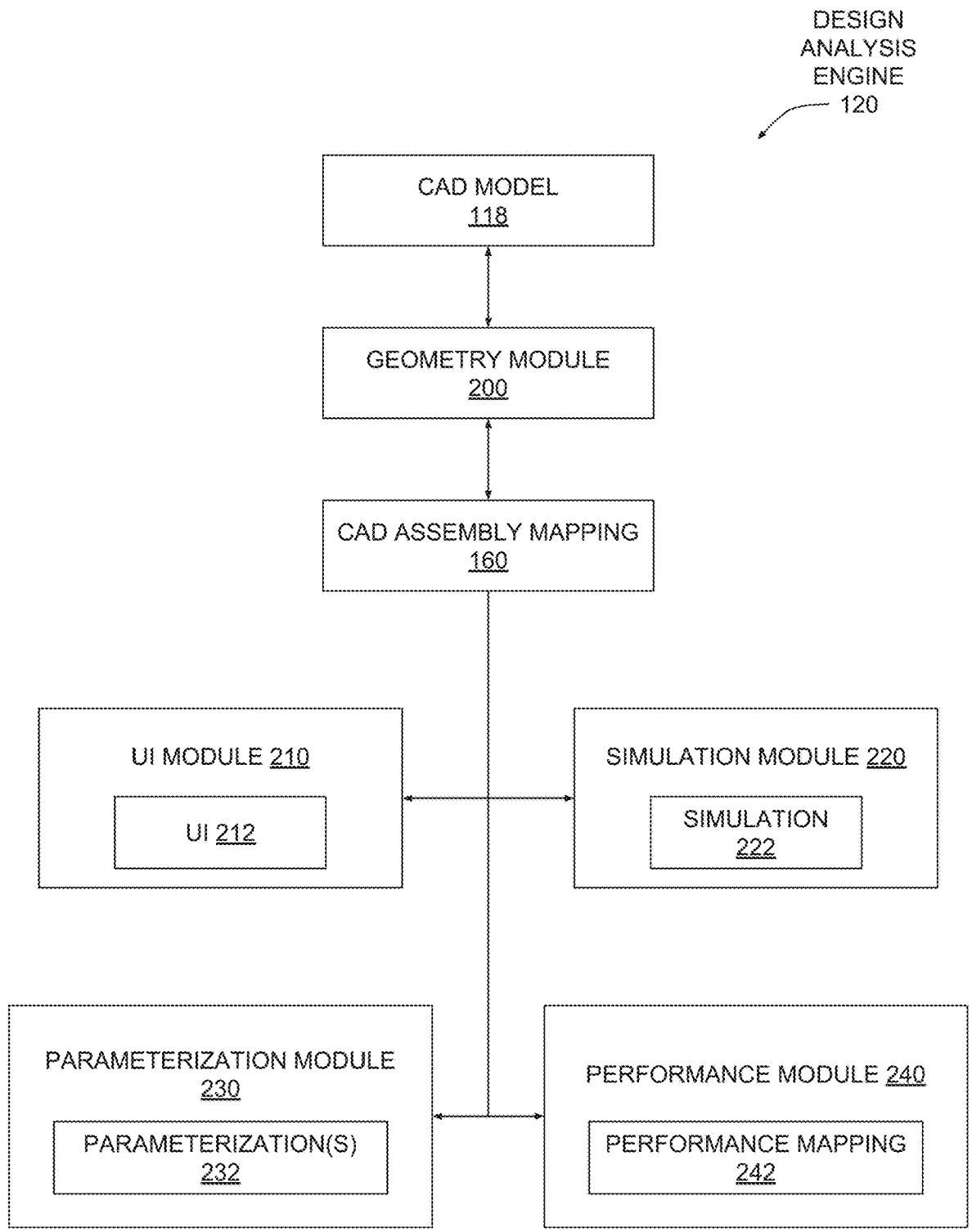
FIG. 2 is a more detailed illustration of the design analysis engine of FIG. 1, according to various embodiments.

FIG. 2 is a more detailed illustration of the design analysis engine of FIG. 1, according to various embodiments. As shown, design analysis engine 120 includes a geometry module 200, a user interface (UI) module 210, a simulation module 220, a parameterization module 230, and a performance module 240, coupled together.

In operation, geometry module 200 analyzes CAD assembly 118 and identifies a set of CAD models and corresponding design data included therein. Based on the design data, geometry module 200 determines how the CAD models are coupled together and then generates topological model 162 and data model 164 included within CAD assembly mapping 160. Topological model 162 is a graph of nodes, where each node represents a different CAD model included in CAD assembly 118 and each edge represents a different connection between CAD models included in CAD assembly 118. Data model 164 is a data structure that includes component entries that represent design data associated with the CAD models included in CAD assembly 118 and connection entries that represent design data associated with the connection between those CAD models.

When generating CAD assembly mapping 160, geometry module 200 maps each 3D model of CAD assembly 118 to a different node of topological model 162 and maps each node of topological model 162 to a different component entry of data model 164. Geometry module 200 also maps each connection between CAD models to a different edge of topological model 162 and maps each edge of topological model 162 to a different connection entry within data model 164. Accordingly, CAD assembly mapping 160 defines multiple mappings between the different models included therein. An example of CAD assembly mapping 160 is described below in conjunction with FIG. 3. An exemplary portion of topological model 162 is described below in conjunction with FIG. 4.

UI module 210 generates a UI 212 based on CAD assembly mapping 160 that allows the user to navigate and analyze CAD assembly 118. UI 212 receives a user selection of one or more nodes of topological model 162 and then UI module 210 traverses topological model 162 to identify other connected nodes. UI module 210 also queries data model 164 to extract component entries associated with the selected and/or connected nodes and/or connection entries associated with connections between the selected and/or connected nodes. UI module then displays the various design data to the user via UI 212. An example of UI 212 is described below in conjunction with FIGS. 5-7.

Simulation module 220 executes a physical simulation based on the CAD model(s) associated with any node(s) identified via the above-described operations of UI module 210 to generate simulation 222. Simulation 222 describes various physical properties of the simulated CAD model(s). An example of simulation 222 is described below in conjunction with FIGS. 6-7.

Parameterization module 230 performs a parametrization process based on the CAD model(s) associated with any node(s) identified via the above-described operations of UI module 210 to generate parameterization 232. Parameterization 232 specifies parametric values associated with the CAD model(s) that can be varied to generate alternate geometry for the CAD model(s). Generative design engine 138 of FIG. 1 can generate such alternate geometry by executing a generative design process with parameterization 232. Examples of parameterization 232 are described below in conjunction with FIGS. 6-7.

Performance module 240 maps data generated via simulation 222 onto topological model 162 to generate performance mapping 242. Performance mapping 242 indicates critical load pathways between CAD models included in CAD assembly 118 and can be used to identify portions of CAD assembly 118 that may need to be modified or redesigned. An example of performance mapping 242 is described below in conjunction with FIGS. 6-7.

Via the above techniques, design analysis engine 120 facilitates more effective navigation of complex CAD assemblies compared to conventional techniques. Further, design analysis engine 120 provides tools for automatically performing various design tasks that would be difficult or impossible to perform with conventional techniques.

Generating a CAD Assembly Mapping for a CAD Assembly

Figure 3:
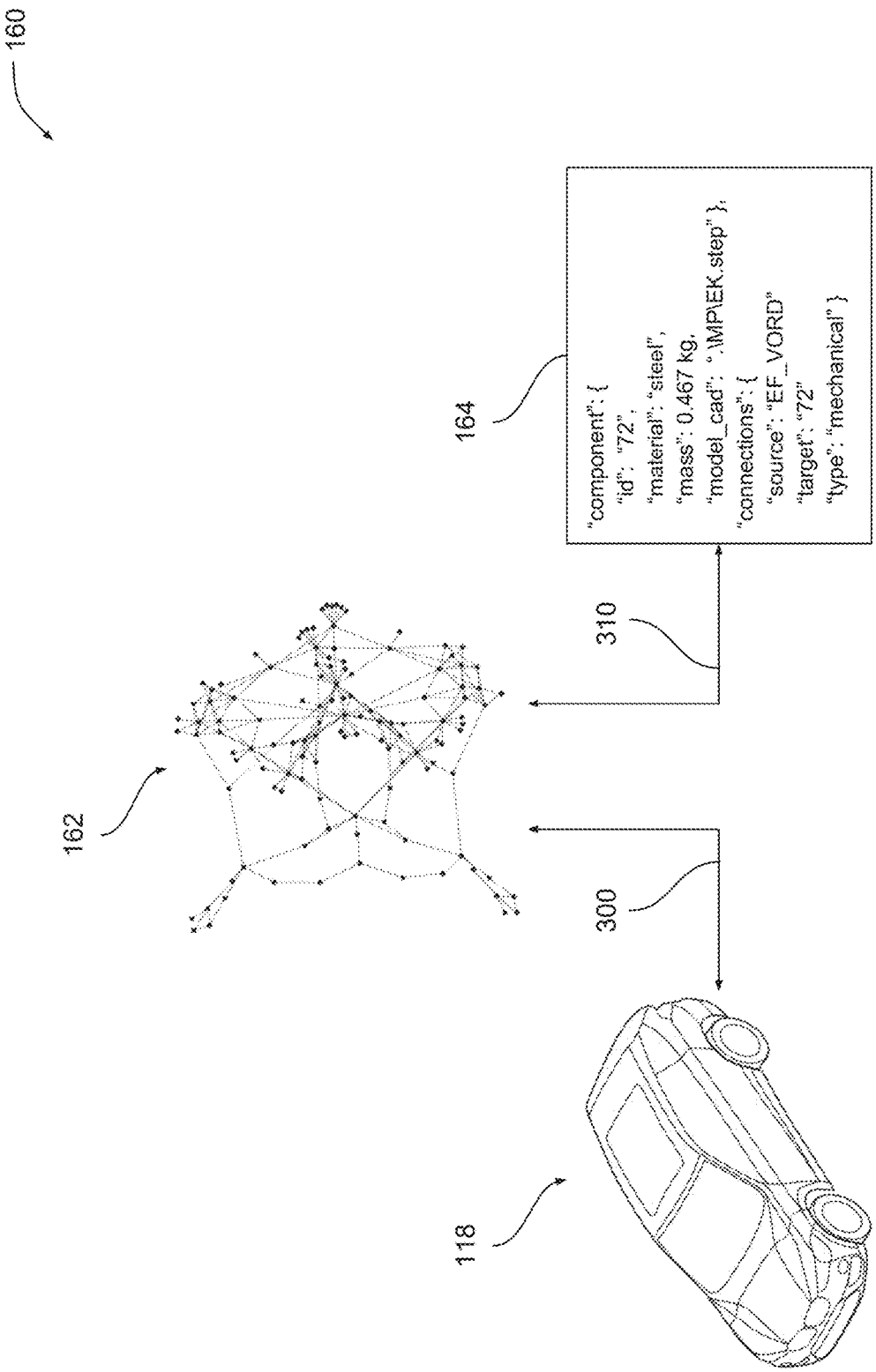
FIG. 3 is exemplary illustration of the CAD assembly mapping of FIG. 2, according to various embodiments.

FIG. 3 is exemplary illustration of the CAD assembly mapping of FIG. 2, according to various embodiments. As shown, CAD assembly mapping 160 includes CAD assembly 118, topological model 162, and data model 164. Multi-model mapping 160 also includes a mapping 300 between CAD assembly 118 and topological model 162 and a mapping 310 between topological model 162 and data model 164.

In the example shown, CAD assembly 118 includes 3D geometry associated with an automobile design. In particular, CAD assembly 118 includes a set of 3D CAD models corresponding to different components of the automobile design. CAD assembly 118 further includes additional design data indicating how those components are coupled together or otherwise related to one another. CAD assembly 118 could include, for example, design data indicating that specific subsets of 3D models belong to separate subassemblies of CAD assembly 118. CAD assembly 118 could also include design data describing specific joints that couple together individual CAD models.

Topological model 162 includes a node for each separate CAD model included in CAD assembly 118 and an edge for each relationship between CAD models included in CAD assembly 118. Topological model 162 may also indicate specific groupings of nodes that belong to the same subassembly. Some or all of the nodes in a given subset may be connected to some or all of the other nodes in the subset via edges that indicate physical connections between those nodes and/or edges that indicate logical connections between nodes. As mentioned, an example of a portion of topological model 162 is described below in conjunction with FIG. 4.

Data model 164 is a structured data set that includes component entries and connection entries. A component entry includes design data associated with a specific 3D model included in CAD assembly 118 and corresponding to a specific node of topological model 162. For example, the exemplary component entry included in data model 164 shown in FIG. 3 indicates a material for the corresponding CAD model as well as a mass value for the corresponding CAD model. A connection entry includes design data associated with a physical or logical relationship between 3D models included in CAD assembly 118 and corresponding to a specific edge of topological model 162. For example, the exemplary connection entry included in data model 164 shown in FIG. 3 indicates a source component and a target component for the connection as well as a connection type for the connection.

Once design analysis engine 120 generates topological model 162 and data model 164 in the manner previously described, design analysis engine 120 then generates mappings 300 and 310. Mapping 300 associates specific CAD models included in CAD assembly 118 with specific nodes of topological model 162. Mapping 300 also associates specific relationships expressed in CAD assembly 118 with specific edges of topological model 162. In one embodiment, topological model 162 may be modified to include mapping 300. Mapping 310 associates specific component entries included in data model 164 with specific nodes of topological model 162. Mapping 310 also associates specific connection entries of data model 164 with specific edges of topological model 162. In one embodiment, topological model 162 may be modified to include mapping 310. In another embodiment, elements of topological model 162 may be modified to include relevant portions of mapping 310 and different elements of data model 164. An exemplary portion of topological model 162 is described below in conjunction with FIG. 4.

Figure 4:
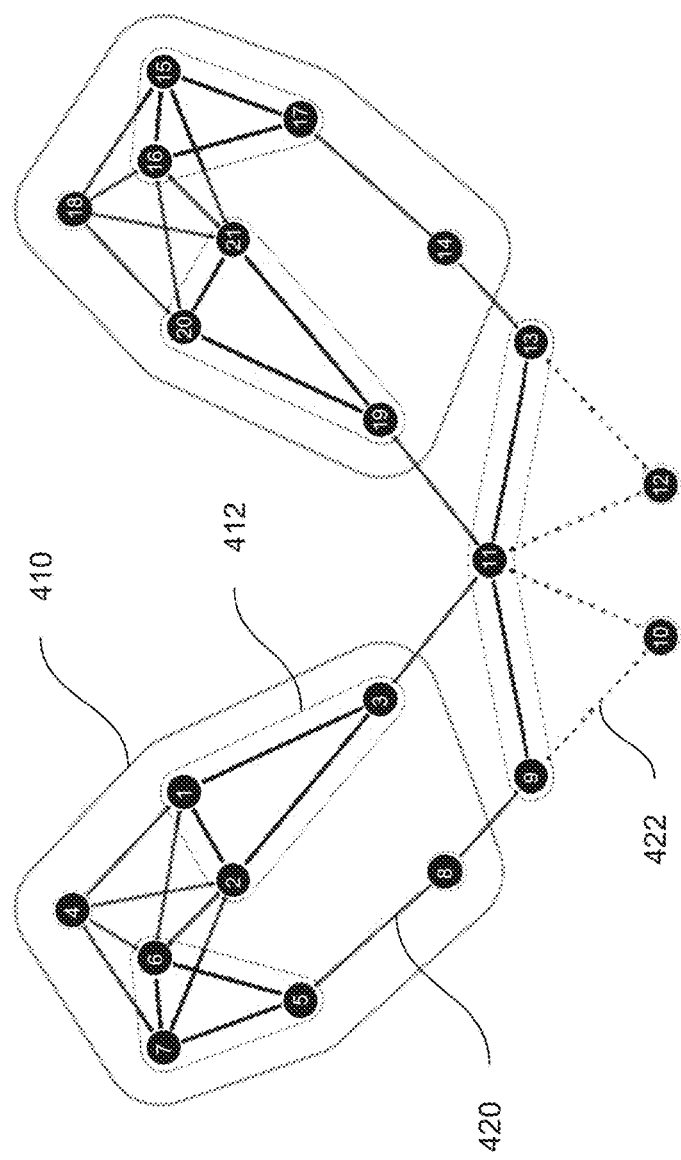
FIG. 4 is an exemplary illustration of a portion of the topological model of FIG. 3, according to various embodiments.

FIG. 4 is an exemplary illustration of a portion of the topological model of FIG. 3, according to various embodiments. As shown, portion 400 of topological model 162 includes a set of nodes 1-21 coupled together by various edges. As discussed, each node corresponds to a different CAD model included in CAD assembly 118 and each edge corresponds to a connection between CAD models included in CAD assembly 118. Nodes 1-8 are included within a sub-graph 410. Nodes 1-3 are included within a sub-subgraph 412 that, in turn, is included within sub-graph 410. Edge 420 between nodes 5 and 8 represents a mechanical joint. Edge 422 between nodes 9 and 10 represents a kinematic joint.

Referring generally to FIGS. 3-4, design analysis engine 120 generates topological model 162 (including portion 400 shown in FIG. 4) in order to synthesize the physical arrangement of the CAD models included in CAD assembly 118 with the logical relationships between the CAD models included in CAD assembly 118. Design analysis engine 120 further generates data model 164 in order to synthesize design data associated with each CAD model included in CAD assembly 118 with design data corresponding to the various relationships between CAD models included in CAD assembly 118 in a structured manner. Design analysis engine 120 then generates mappings 300 and 310 of CAD assembly mapping 160 in order to interrelate the separate representations of CAD models and CAD model relationships included in CAD assembly 118, topological model 162, and data model 164.

Design analysis engine 120 can then efficiently navigate CAD assembly 118 to locate specific CAD models within CAD assembly 118 based on mapping 300 and based on user interactions with nodes and/or edges of topological model 162. Design analysis engine 120 can also efficiently query data model 164 based on mapping 310 to locate specific entries corresponding to the nodes and/or edges of topological model 162 with which the user interacts. In this manner, design analysis engine 120 obtains design data corresponding to the CAD models design analysis engine 120 locates within CAD assembly 118. Design analysis engine 120 performs various steps to generate CAD assembly mapping 160 and subsequently navigate CAD assembly 118, as described in greater detail below in conjunction with FIG. 5.

Figure 5:
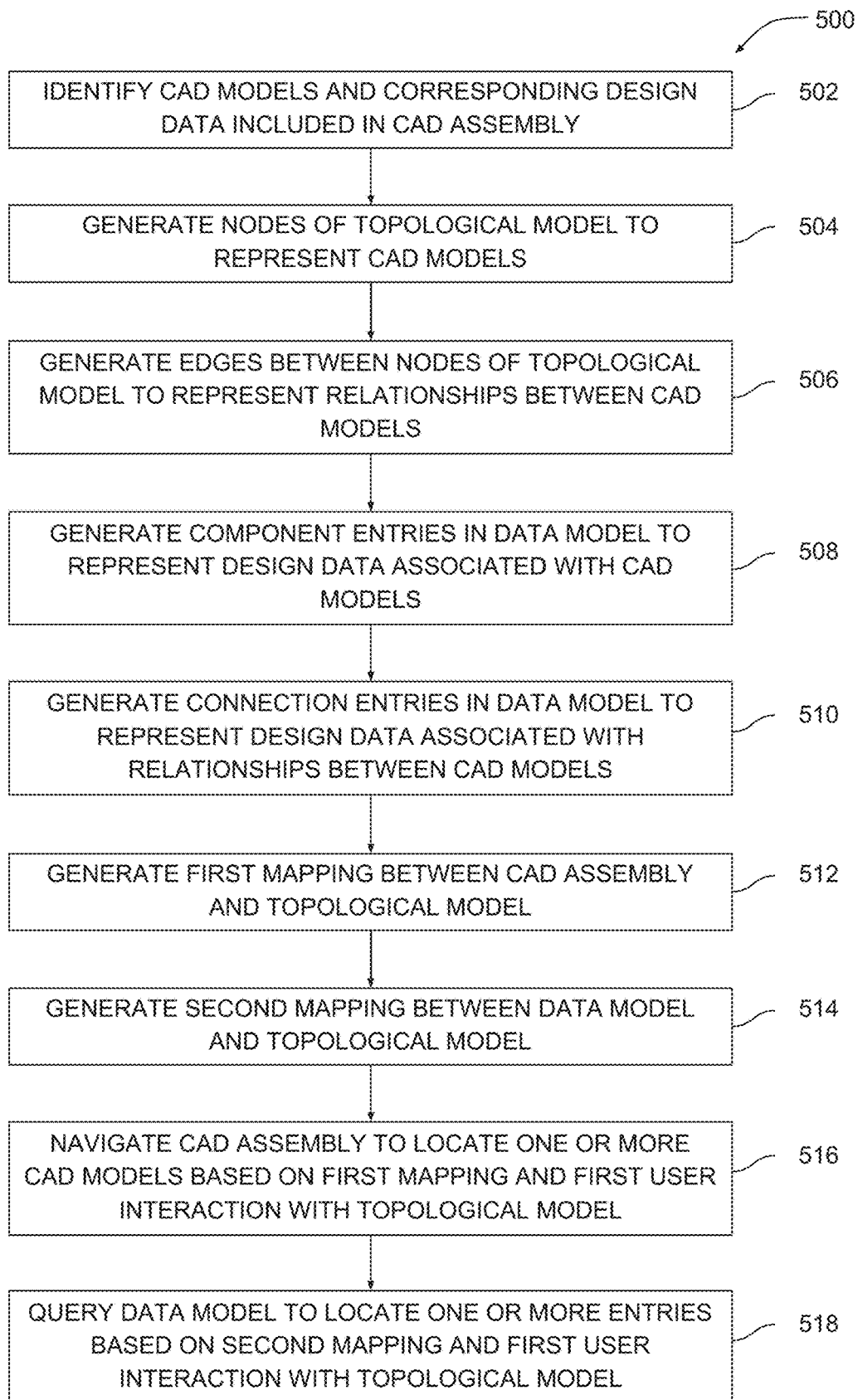
FIG. 5 is a flow diagram of method steps for generating a CAD assembly mapping, according to various embodiments.

FIG. 5 is a flow diagram of method steps for generating a CAD assembly mapping, according to various embodiments. Although the method steps are described in conjunction with the systems of FIGS. 1-4, persons skilled in the art will understand that any system configured to perform the method steps in any order falls within the scope of the present invention.

As shown, a method 500 begins at step 502, where geometry module 200 within design analysis engine 120 analyzes a CAD assembly to identify CAD models and corresponding design data included in the CAD assembly. The CAD assembly can include numerous CAD models that are physically and/or logically related to one another. The design data indicates properties of each CAD model. For example, design data associated with a given CAD model could include a mass value for the CAD model. The design data also describes the different relationships between CAD models. For example, the design data could indicate that two CAD models are joined together via a mechanical joint.

At step 504, geometry module 200 generates nodes of a topological model to represent the CAD models identified at step 502. In so doing, design analysis engine 120 generates a different node for each CAD model included in the CAD assembly. Nodes of an exemplary topological model and portion thereof are illustrated in FIGS. 3 and 4, respectively.

At step 506, geometry module 200 generates edges between the nodes of the topological model generated at step 504 to represent relationships between CAD models included in the CAD assembly. Geometry module 200 generates a different edge for each relationship between CAD models included in the CAD assembly. Edges between nodes in an exemplary topological model and portion thereof are illustrated in FIGS. 3 and 4, respectively.

At step 508, geometry module 200 generates component entries within a data model to represent design data associated with CAD models. Geometry module 200 generates a different component entry for each CAD model included in the CAD assembly. A given component entry includes design data specifying different properties of the corresponding CAD model including, for example, structural attributes, physical properties, and so forth.

At step 510, geometry module 200 generates connection entries within the data model to represent design data associated with relationships between CAD models. Geometry module 200 generates a different connection entry for each relationship between CAD models described in the CAD assembly. A given connection entry includes design data describing the type of relationship, the different CAD models to which the relationship applies, and so forth.

At step 512, geometry module 200 generates a first mapping between the CAD assembly and the topological model. In particular geometry module 200 associates each CAD model included in the CAD assembly with a corresponding node included in the topological model and associates each relationship between CAD models with a corresponding edge included in the topological model. In one embodiment, geometry module 200 updates the topological model to include data associated with the first mapping.

At step 514, geometry module 200 generates a second mapping between the data model and the topological model. In particular, geometry module 200 associates each component entry of the data model with a corresponding node included in the topological model and associates each connection entry of the data model with a corresponding edge included in the topological model. In one embodiment, geometry module 200 updates the topological model to include data associated with the second mapping. Via the above steps, geometry module 200 generates a CAD assembly mapping.

At step 516, UI module 210 within design analysis engine 120 navigates the CAD assembly to locate one or more CAD models based on the first mapping and based on a first user interaction with the topological model. For example, UI module 210 could receive user input indicating a selection of a particular node in the topological model. UI module 210 could then obtain a CAD model corresponding to the selected node from the CAD assembly based on the first mapping. UI module 210 would then display the CAD model to the user.

At step 518, UI module 210 queries the data model to locate one or more entries based on the second mapping and based on the first user interaction with the topological model. For example, UI module 210 could obtain a component entry corresponding to the selected node from the data model based on the second mapping. UI module 210 would then display the design data stored in the component entry to the user.

Design analysis engine 120 implements the method 500 in order to generate the various data and relationships between data included in CAD assembly mapping 160, as described in detail above in conjunction with FIGS. 1-4. Based on CAD assembly mapping 160, design analysis engine 120 can efficiently navigate CAD assemblies automatically on behalf of the user, thereby increasing the efficiency with which the user can analyze complex CAD assemblies. Design analysis engine 120 also includes additional tools that facilitate more complex forms of CAD assembly navigation as well as other tools that automate various design tasks associated with CAD assemblies and CAD models, as described in greater detail below in conjunction with FIGS. 6-10.

Automatically Performing Design Tasks Via a CAD Assembly Mapping

Figure 6:
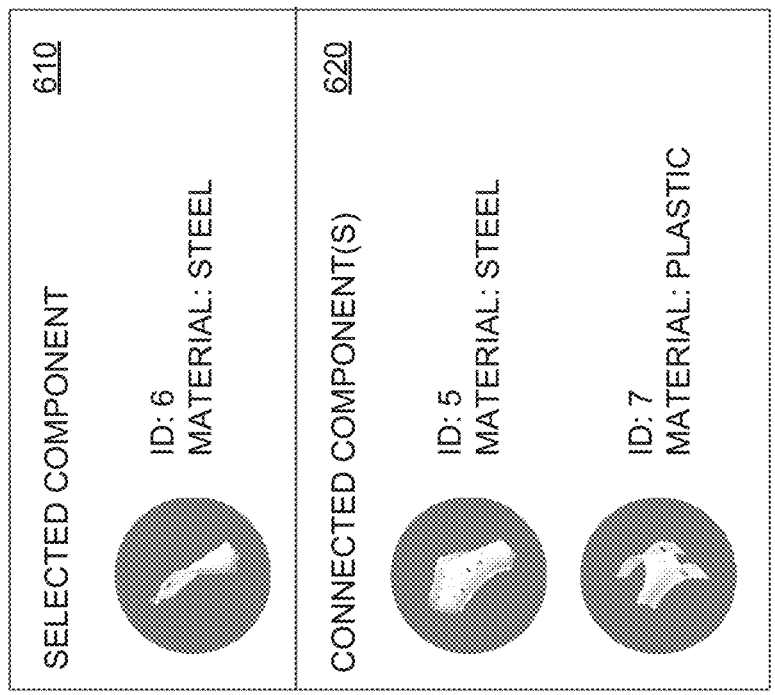
FIG. 6 illustrates a user interface that facilitates navigating a CAD assembly, according to various embodiments.
Figure 6:
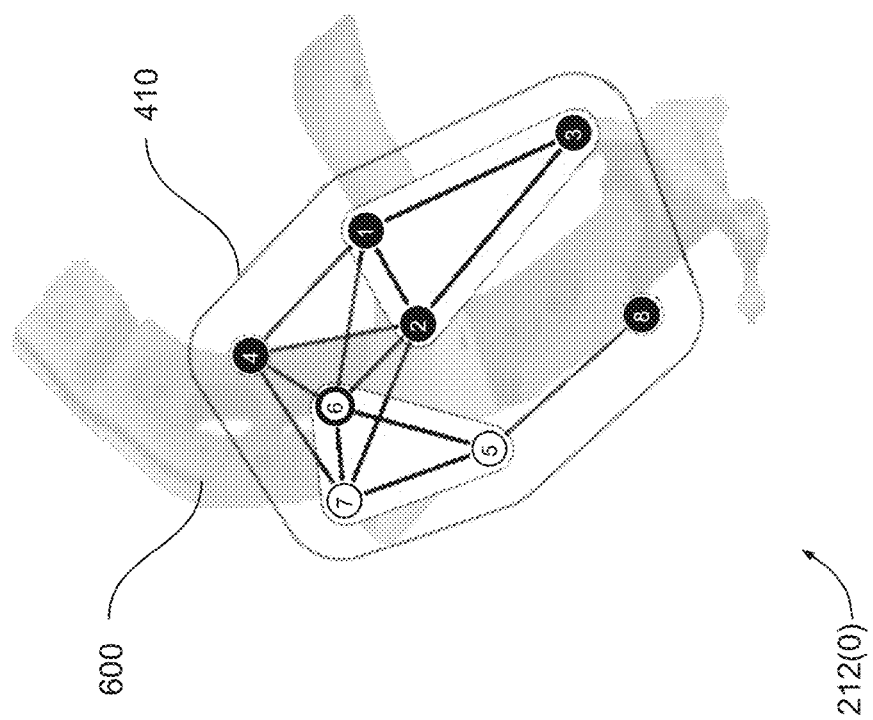

FIG. 6 illustrates a user interface that facilitates navigating a CAD assembly, according to various embodiments. As shown, UI 212(0) includes a CAD sub-assembly 600, sub-graph 410 of FIG. 4, and component panels 610 and 620. In the example shown, sub-graph 410 includes nodes that represent different CAD models included in CAD sub-assembly 600 and includes edges that represent different relationships between those CAD models.

To generate UI 212(0), UI module 210 within design analysis engine 120 renders CAD sub-assembly 600 and projects sub-graph 410 over CAD sub-assembly 600. UI module 210 positions each node of sub-graph 410 at a location that is associated with the corresponding CAD model and then renders various edges between those nodes. In this manner, UI module 210 displays a topology of nodes that visually represents the arrangement of different CAD models within a CAD assembly and any connections therebetween. UI module 210 can perform this approach to project any portion of topological model 162 over any corresponding portion of CAD assembly 118 and, further, to project topological model 162 as a whole over CAD assembly 118 as a whole.

UI module 210 also renders component panels 610 and 620 to display various design data associated with specific CAD models within CAD sub-assembly 600 that are identified based on user interactions with sub-graph 410. In response to a user selection of a node of sub-graph 410, UI module 210 determines, based on mapping 310, a component entry included in data model 164 corresponding to that node. UI module 210 then populates panel 610 with data extracted from the component entry. UI module 210 also identifies, based on topological model 162, any nodes that are connected to the selected node via one or more edges. UI module 210 then queries data model 164 to retrieve component entries associated with these connected nodes and populates panel 620 with data extracted from those component entries. UI module 212 can perform the above techniques in order to retrieve and display design data associated with individual CAD models, as described, and also to retrieve and display design data associated with assemblies and/or sub-assemblies of CAD models.

UI module 210 facilitates efficient navigation of CAD assembly 118 because projecting graphs of nodes derived from topological model 162 over corresponding assemblies and sub-assemblies of CAD models creates a convenient proxy with which the user can easily interact to access information associated with those CAD models. In addition, once the user has identified one or more CAD models via the techniques described above, the user can perform various design tasks with those CAD models, as described in greater detail below in conjunction with FIGS. 7-8.

Figure 7:
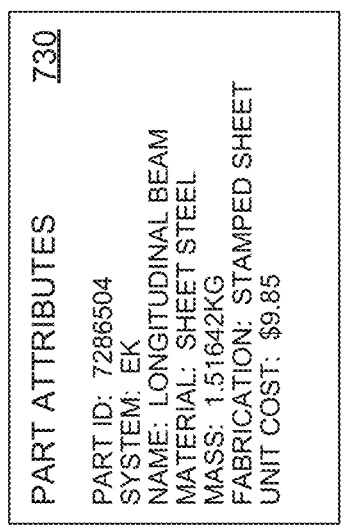
FIG. 7 illustrates a user interface that facilitates modifying a component of a CAD assembly, according to various embodiments.
Figure 7:
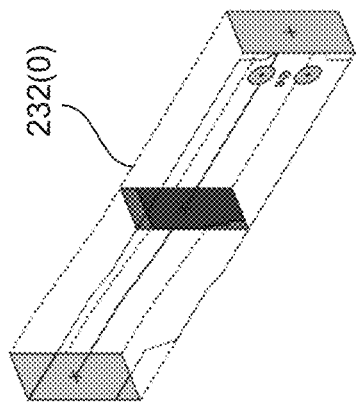
Figure 7:
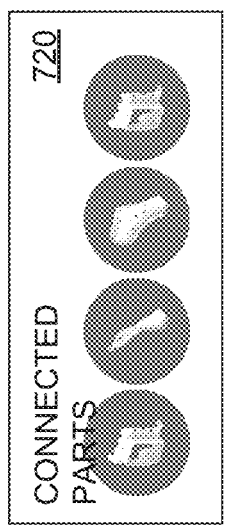
Figure 7:
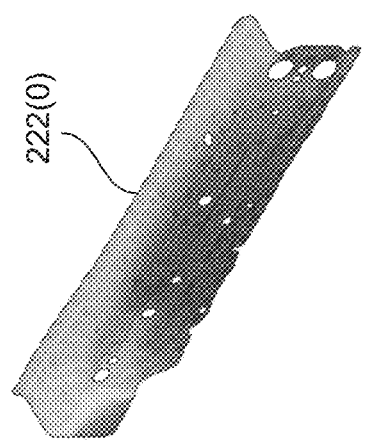
Figure 7:
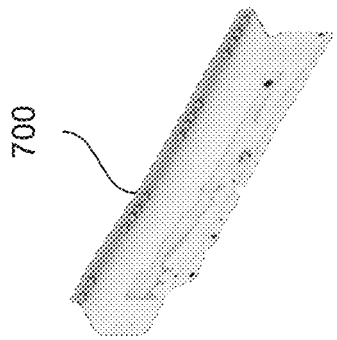
Figure 7:
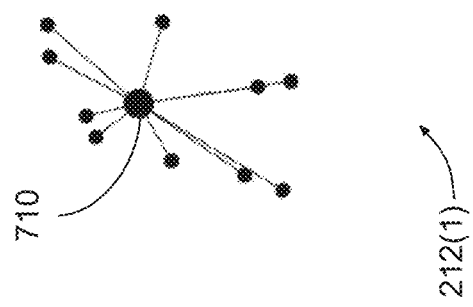

FIG. 7 illustrates a user interface that facilitates modifying a component of a CAD assembly, according to various embodiments. As shown, UI 212(1) includes a CAD model 700, a sub-graph 710 of topological model 162, panels 720 and 730, simulation 222(0), and parameterization 232(0). In the example shown, CAD model 700 is selected via a user selection of a corresponding node, in like fashion as discussed above in conjunction with FIG. 6.

Based the selection of CAD model 700, UI module 210 analyzes topological model 162 and determines sub-graph 710. Sub-graph 710 includes the node corresponding to CAD model 700 and any connected nodes. UI module 210 generates panel 720 to depict the CAD models corresponding to those connected nodes and generates panel 730 to display various design data associated with CAD model 700.

In addition, UI module 210 interoperates with simulation module 220 to generate simulation 222(0) based on CAD model 700. Simulation engine 220 executes a physical simulation to generate simulation 222(0) based on the 3D geometry associated with CAD model 700 and various design objectives and/or design constraints associated with CAD model 700. Simulation 222(0) indicates various engineering quantities associated with CAD model 700, such as, for example, maximum stress, maximum strain, and so forth. This approach advantageously allows the user to quickly generate simulation results for 3D models that are already integrated deeply into a complex CAD assembly.

UI module 210 also interoperates with parameterization module 230 to generate parameterization 232(0). Parameterization 232(0) is a parametric model of the 3D geometry associated with CAD model 700. The various parameters set forth in parameterization 232(0) can be modified to generate alternate geometry for CAD model 700. Parameterization module 232 transmits parameterization 232(0) to generative design engine 138 of FIG. 1. In response, generative design engine 138 performs a generative design process to generate a multitude of alternate design geometries for CAD model 700. This approach advantageously allows the user to quickly generate alternative geometry for 3D models that are already integrated deeply into a complex CAD assembly. UI module 210 can perform analogous techniques to those described above with respect to CAD assemblies and CAD sub-assemblies instead of CAD models, as described below in conjunction with FIG. 8.

Figure 8:
FIG. 8 illustrates a user interface that facilitates modifying a CAD sub-assembly, according to various embodiments.
Figure 8:
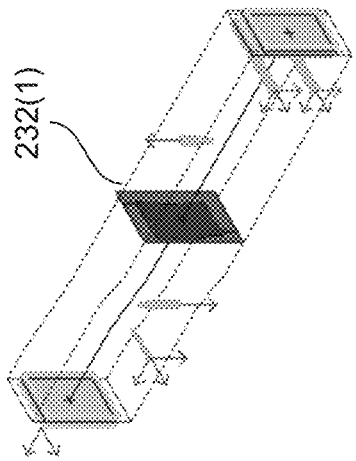
Figure 8:
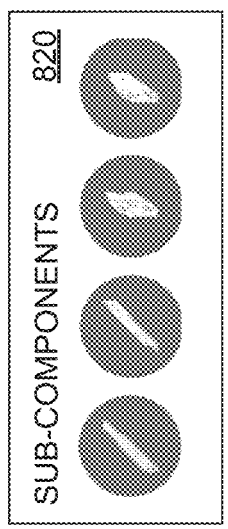
Figure 8:
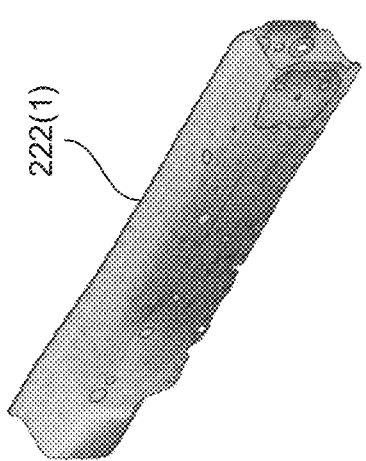
Figure 8:
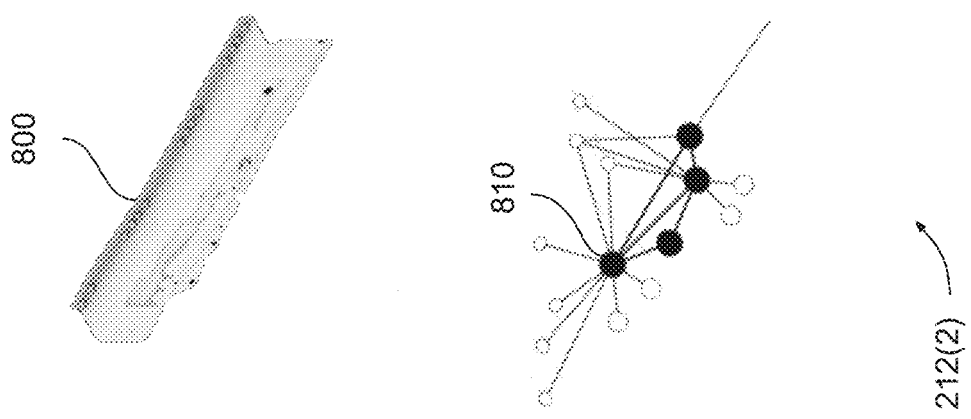

FIG. 8 illustrates a user interface that facilitates modifying a CAD sub-assembly, according to various embodiments. As shown, UI 212(2) includes a CAD assembly 800, a sub-graph 810 of topological model 162, panels 820 and 830, simulation 222(1), and parameterization 232(1). In the example shown, CAD assembly 800 is selected via a user selection of a corresponding node and subsequent identification of connected nodes included in an assembly or sub-assembly, in like fashion as discussed above in conjunction with FIG. 6.

Based the selection of CAD assembly 800, UI module 210 within design analysis engine 120 analyzes topological model 162 and determines sub-graph 810. Sub-graph 810 includes the nodes corresponding to CAD assembly 800. UI module 210 generates panel 820 to depict the CAD models included in CAD assembly 800 and generates panel 830 to display various design data associated with CAD assembly 800.

In addition, UI module 210 interoperates with simulation module 220 to generate simulation 222(1) based on CAD assembly 800. Simulation engine 220 executes a physical simulation to generate simulation 222(1) based on the interconnected 3D geometry associated with the CAD models within CAD assembly 800 and various design objectives and/or design constraints associated with those CAD models. Simulation 222(1) indicates various engineering properties associated with CAD assembly 800, including, for example, linkage angular velocity, maximum torque, and so forth. This approach advantageously allows the user to quickly generate simulation results for assemblies of 3D models that are already integrated deeply into a complex CAD assembly.

UI module 210 also interoperates with parameterization module 230 to generate parameterization 232(1) for CAD assembly 800. Parameterization 232(1) is a parametric model of the interconnected 3D geometry associated the CAD models included in CAD assembly 800. These parameters can be modified to generate alternate geometry for CAD assembly 800 and/or alternate configurations of CAD models included therein. Parameterization module 232 transmits parameterization 232(1) to generative design engine 138 of FIG. 1 to generate a multitude of alternate design geometries for CAD assembly 800. This approach advantageously allows the user to quickly generate alternative geometry for 3D assemblies and 3D models included therein when those assemblies are already integrated deeply into a complex CAD assembly.

Referring generally to FIGS. 7-8, the techniques described in conjunction with these Figures are generally feasible when CAD models and/or CAD sub-assemblies can be easily located within CAD assembly 118. As a general matter, conventional techniques to executing physical simulations and/or parameterizing CAD models cannot be applied to complex CAD assemblies without the user manually and painstakingly isolating the CAD models and/or CAD sub-assemblies of interest from the overarching CAD assembly. Accordingly, the techniques disclosed in conjunction with these Figures are especially useful in the context of performing the specific design tasks of executing simulations and generating parameterizations. The different simulations generated via the techniques described above can further be used to modify topological model 162 to illustrate one or more critical load pathways, as described in greater detail below in conjunction with FIG. 9.

Figure 9:
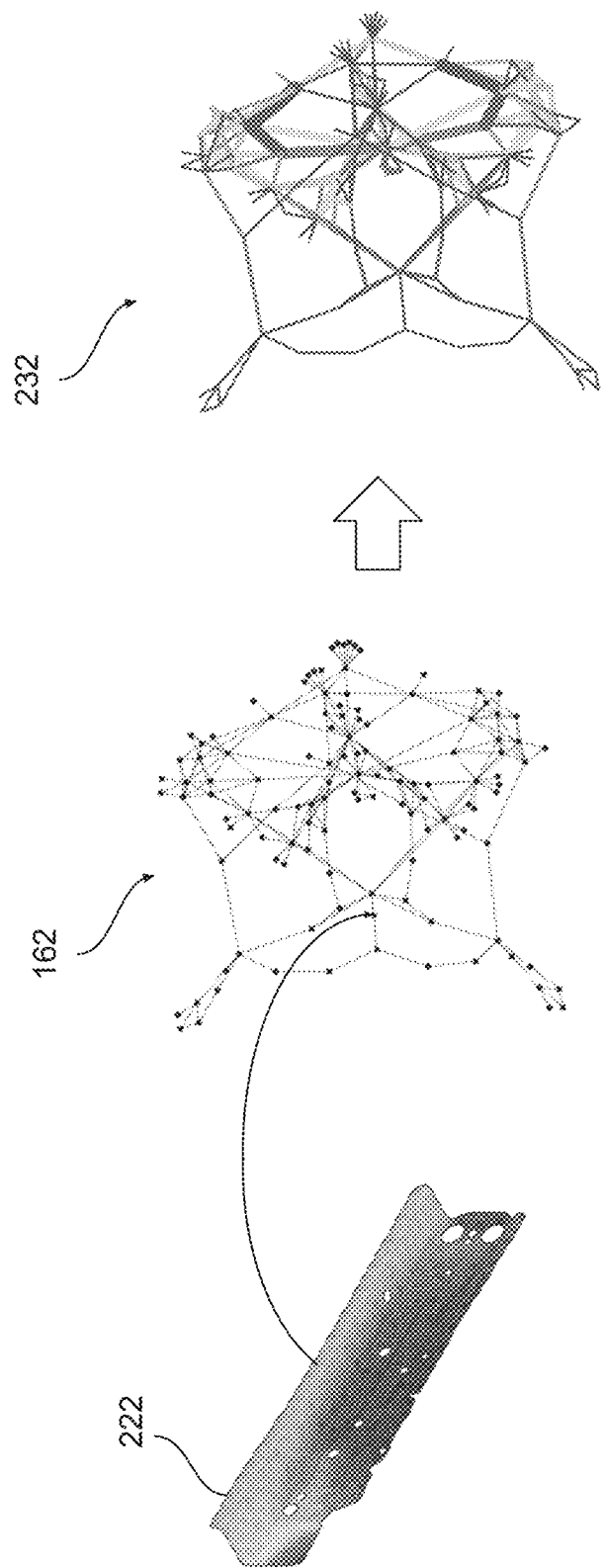
FIG. 9 illustrates a user interface element that is generated to emphasize one or more critical paths of a CAD assembly, according to various embodiments.

FIG. 9 illustrates a user interface element that is generated to emphasize one or more critical paths of a CAD assembly, according to various embodiments. As shown, simulation 222 is mapped onto topological model 162 in order to generate performance mapping 232. Performance mapping 232 visually emphasizes each edge of topological model 162 relative to a corresponding amount of loading. In the example shown, thicker edges indicate elevated levels of loading. Performance module 230 can further generate performance mapping 232 to depict critical load pathways associated with CAD assembly 118. For example, edges corresponding to a maximum load along a given pathway could be rendered in a specific color. Based on performance mapping 232, the user can more easily determine specific CAD models within CAD assembly 118 that merit modification and/or redesigning in order to improve performance.

Referring generally to FIGS. 6-9, the disclosed design analysis engine 120 and the various modules included therein advantageously provide the user with several automated techniques for performing various design tasks based on CAD assembly mapping 162. With conventional CAD applications, users have to manually interact directly with complex CAD assemblies. Manual interaction with complex CAD assemblies typically is tedious and time consuming. Accordingly, the disclosed techniques represent a significant technological improvement with specific applications in the realm of mechanical engineering and design. The disclosed techniques are described in greater detail below in conjunction with FIG. 10.

Figure 10:
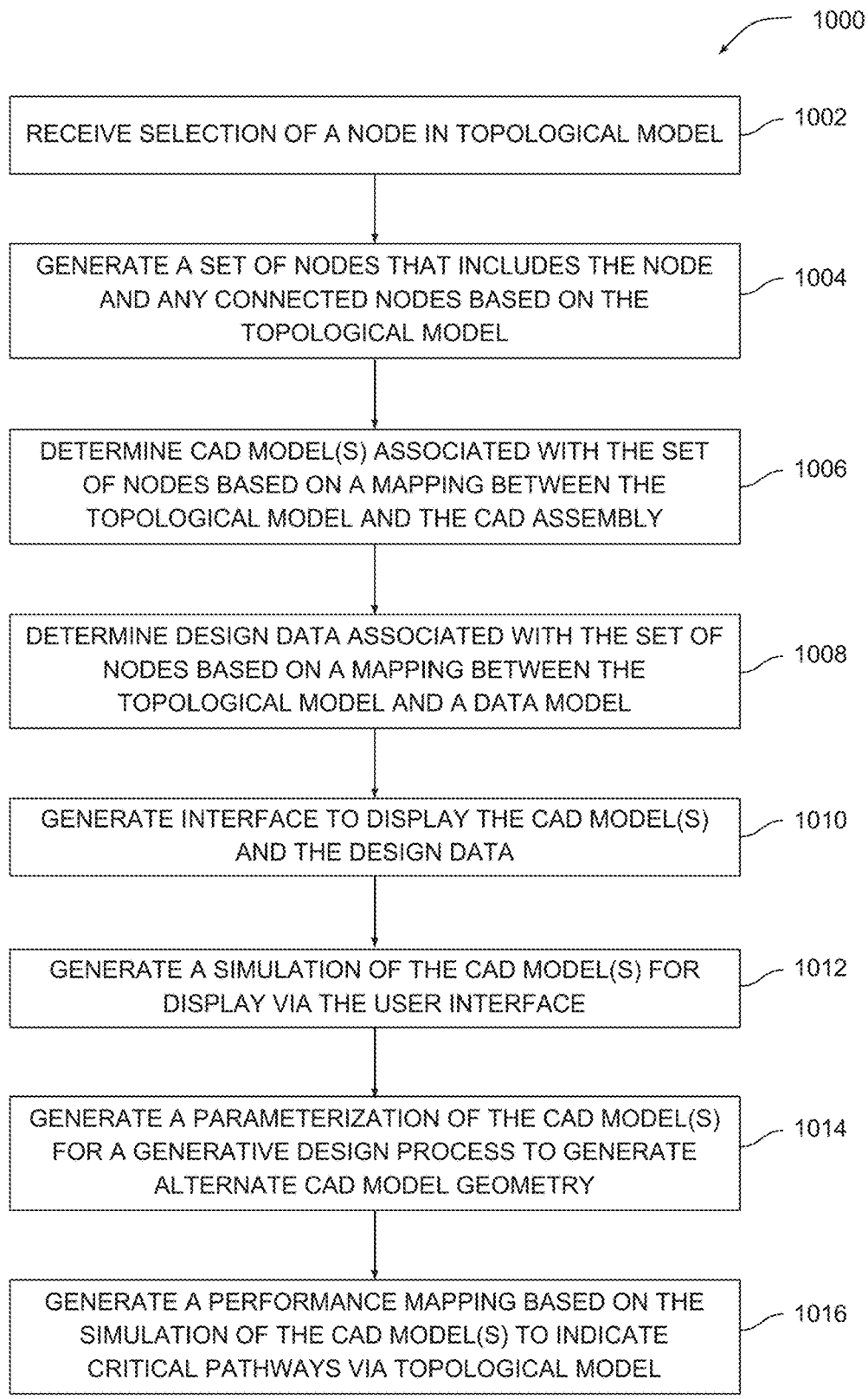
FIG. 10 is a flow diagram of method steps for automatically executing design tasks based on a CAD assembly mapping, according to various embodiments.

FIG. 10 is a flow diagram of method steps for automatically executing design tasks based on a CAD assembly mapping, according to various embodiments. Although the method steps are described in conjunction with the systems of FIGS. 1-9, persons skilled in the art will understand that any system configured to perform the method steps in any order falls within the scope of the present invention.

As shown, a method 1000 begins at step 1002, where UI module 210 within design analysis engine 120 receives, via a UI, a user selection of a node in a topological model. The UI includes a graphical rendering of the CAD assembly (or a portion thereof) along with a projection of the topological model (or a portion thereof). UI module 200 positions each node of the topological model within the UI relative to a corresponding CAD model within the CAD assembly and positions each edge relative to the associated nodes, as is shown, for example, in FIG. 6. In this manner, UI module 200 provides an intuitive simplification of the CAD assembly that represents the various relationships between CAD models included therein.

At step 1004, UI module 210 generates a set of nodes that includes the node and any connected nodes based on the topological model. In so doing, UI module 210 traverses the topological model across edges that link the node selected at step 1002 to any adjacent connected nodes. The selected node and the connected nodes could, for example, represent a CAD sub-assembly or other physical and/or logical grouping of CAD models within the CAD assembly.

At step 1006, UI module 210 determines the CAD model(s) associated with the set of nodes based on a mapping between the topological model and the CAD assembly. The mapping between the topological model and the CAD assembly maps each node of the topological model to a different CAD model included in the CAD assembly and maps each edge included in the topological model to a different relationship between CAD models set forth in the CAD assembly. Mapping 300 of FIG. 3 is one example of such a mapping.

At step 1008, UI module 210 determines design data associated with the set of nodes based on a mapping between the topological model and a data model. The mapping between the topological model and the data model maps each node of the topological model to a different component entry in the data model and maps each edge included in the topological model a different connection entry in the data model. Mapping 310 of FIG. 3 is one example of such a mapping.

At step 1010, UI module 200 generates a UI to display the CAD model(s) and corresponding design data. The UI includes a graphical rendering of the CAD model(s), the portion of the topological model corresponding to the CAD model(s), and various design data associated with the CAD model(s). In one embodiment, UI module 210 generates the UI to display just the selected CAD model, as with UI 212(1) described above in conjunction with FIG. 7. In another embodiment, UI module 210 may generate the UI to display an assembly that includes the CAD model(s), as with UI 212(2) described above in conjunction with FIG. 8.

At step 1012, simulation module 220 within design analysis engine 120 generates a simulation of the CAD model(s) for display via the user interface. Simulation module 220 executes a physical simulation to determine various engineering properties of the CAD model(s). For example, simulation module 220 could implement a finite element analysis (FEA) solver to determine various static and dynamic properties of the CAD model(s).

At step 1014, parameterization module 230 within design analysis engine 120 generates a parameterization of the CAD model(s) for a generative design process to generate alternate CAD model geometry. For example, parameterization module 230 could generate one or more parametric functions for various design attributes associated with CAD models(s). Parameterization module 230 transmits the parameterized version of the CAD models to generative design engine 138 of FIG. 1 to perform the generative design process.

At step 1016, performance module 240 within design analysis engine 120 generates a performance mapping based on the simulation of the CAD model(s) generated at step 1012 in order to indicate critical load pathways of the CAD assembly via the topological model. The performance mapping graphically emphasizes a given edge of the topological mapping relative to the amount of loading conducted through the given edge. In this manner, the performance mapping visually indicates regions of the CAD assembly that potentially merit modification and/or redesigning.

In sum, a design analysis engine analyzes a CAD assembly to generate a topological model. The topological model is a graph of nodes coupled together via a set of edges. Each node represents a different CAD model and each edge represents a different connection between two CAD models. The design analysis engine also analyzes the CAD assembly to generate a data model that corresponds to the topological model. The data model is a structured dataset that includes component entries and connection entries. A component entry includes design data associated with a CAD model that is included in the CAD assembly. A connection entry includes design data associated with a physical or logical connection between CAD models that are included in the CAD assembly. A user can navigate the CAD assembly and automatically performs design tasks with elements of the CAD assembly by interacting with the topological model.

At least one technological advantage of the disclosed techniques relative to the prior art is that complex CAD assemblies can be navigated automatically and efficiently. Accordingly, design data associated with specific CAD models within complex CAD assemblies can be extracted and quickly provided to users, thereby expediting the design process. Another technological advantage of the disclosed techniques relative to the prior art is that specific design tasks that depend on one or more CAD models included within a complex CAD assembly can be performed automatically rather than manually. The disclosed techniques are especially useful in mechanical engineering applications where CAD assemblies include thousands of interconnected CAD models that cannot easily be located in order to perform such design tasks. These technological advantages represent one or more technological advancements relative to prior art approaches.

1. Some embodiments include a computer-implemented method for analyzing computer-aided design (CAD) assemblies, the method comprising generating a first mapping between a set of topological elements included in a topological model of a CAD assembly, a set of CAD elements included in the CAD assembly, and a set of data elements included in a data model, receiving a first user interaction via a first topological element included in the set of topological elements, and based on the first mapping, generating a first user interface element that includes a first CAD element that is derived from the set of CAD elements and a first data element that is derived from the set of data elements.

2. The computer-implemented method of clause 1, wherein the topological model comprises a graph of nodes, and the first topological element comprises a first node that is included in the graph of nodes or a first edge that is included in the graph of nodes.

3. The computer-implemented method of any of clauses 1-2, wherein the CAD assembly comprises a plurality of CAD models, and the first CAD element comprises a first CAD model that is included in the plurality of CAD models or a first relationship between at least two CAD models that are included in the plurality of CAD models.

4. The computer-implemented method of any of clauses 1-3, wherein the data model comprises a plurality of entries, and the first data element comprises a component entry that is included in the plurality of entries and indicates data corresponding to a CAD model or a connection entry that is included in the plurality of entries and indicates data corresponding to a relationship between at least two CAD models.

5. The computer-implemented method of any of clauses 1-4, wherein the set of topological elements includes a first node and a first edge, the set of CAD elements includes a first CAD model and a first relationship between at least two CAD models, and the data model includes a first component entry and a first connection entry.

6. The computer-implemented method of any of clauses 1-5, wherein the first node corresponds to both the first CAD element and the first component entry and the first edge corresponds to both the first relationship between at least two CAD models and the first connection entry.

7. The computer-implemented method of any of clauses 1-6, further comprising modifying the topological model to include the first mapping, and modifying the topological model to include the data model.

8. The computer-implemented method of any of clauses 1-7, wherein modifying the topological model to include the data model comprises modifying each topological element included in the set of topological elements to include a different data element included in the data model.

9. The computer-implemented method of any of clauses 1-8, wherein the first mapping includes a second mapping between the topological model and the CAD assembly and a third mapping between the topological model and the data model.

10. The computer-implemented method of any of clauses 1-9, further comprising based on the topological model, identifying a second CAD element that is coupled to the first CAD element and is derived from the set of CAD elements, and based on the first mapping, generating a second user interface element that includes the second CAD element and a second data element that is derived from the set of data elements.

11. Some embodiments include a non-transitory computer-readable medium storing program instructions that, when executed by a processor, cause the processor to analyze computer-aided design (CAD) assemblies by performing the steps of generating a first mapping between a set of topological elements included in a topological model of a CAD assembly, a set of CAD elements included in the CAD assembly, and a set of data elements included in a data model, receiving a first user interaction via a first topological element included in the set of topological elements, and based on the first mapping, generating a first user interface element that includes a first CAD element that is derived from the set of CAD elements and a first data element that is derived from the set of data elements.

12. The non-transitory computer-readable medium of clause 11, wherein the topological model comprises a graph of nodes, and the first topological element comprises a first node that is included in the graph of nodes or a first edge that is included in the graph of nodes.

13. The non-transitory computer-readable medium of any of clauses 11-12, wherein the CAD assembly comprises a plurality of CAD models, and the first CAD element comprises a first CAD model that is included in the plurality of CAD models or a first relationship between at least two CAD models that are included in the plurality of CAD models.

14. The non-transitory computer-readable medium of any of clauses 11-13, wherein the data model comprises a plurality of entries, and the first data element comprises a component entry that is included in the plurality of entries and indicates data corresponding to a CAD model or a connection entry that is included in the plurality of entries and indicates data corresponding to a relationship between at least two CAD models.

15. The non-transitory computer-readable medium of any of clauses 11-14, wherein the set of topological elements includes a first node and a first edge, the set of CAD elements includes a first CAD model and a first relationship between at least two CAD models, and the data model includes a first component entry and a first connection entry.

16. The non-transitory computer-readable medium of any of clauses 11-15, wherein the first node corresponds to both the first CAD element and the first component entry and the first edge corresponds to both the first relationship between at least two CAD models and the first connection entry.

17. The non-transitory computer-readable medium of any of clauses 11-16, wherein the first CAD element and the second CAD element are included within a CAD subassembly that resides within the CAD assembly.

18. The non-transitory computer-readable medium of any of clauses 11-17, further comprising the step of performing a first operation involving the first CAD element in response to the first user interaction.

19. The non-transitory computer-readable medium of any of clauses 11-18, wherein the first operation comprises at least one of simulating the first CAD element, generating alternative geometry for the first CAD element, and determining at least one critical load pathway associated with the first CAD element.

20. Some embodiments include a system, comprising a memory storing a software application, and a processor that, when executing the software application, is configured to perform the steps of generating a first mapping between a set of topological elements included in a topological model of a CAD assembly, a set of CAD elements included in the CAD assembly, and a set of data elements included in a data model, receiving a first user interaction via a first topological element included in the set of topological elements, and based on the first mapping, generating a first user interface element that includes a first CAD element that is derived from the set of CAD elements and a first data element that is derived from the set of data elements.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for analyzing computer-aided design (CAD) assemblies, the method comprising:
   generating a first mapping that maps each topological element included in a topological model of a CAD assembly to a corresponding CAD element included in a set of CAD elements included in the CAD assembly and a corresponding data element included in a set of data elements included in a data model, wherein the topological model comprises a graph representation of the CAD assembly, the topological model including a set of nodes, wherein each node included in the topological model corresponds to both a CAD element included in the CAD assembly and a data element included in the data model;
   receiving a first selection of a first node included in the topological model; and
   in response to receiving the first selection of the first node, performing the steps of:
      determining a first CAD element included in the CAD assembly that corresponds to the first node based on the first mapping;
      displaying the first CAD element in a user interface;
      determining a first data element included in the data model that corresponds to the first node based on the first mapping; and
      displaying the first data element in the user interface.

2. The computer-implemented method of claim 1, wherein the CAD assembly comprises a plurality of CAD models, and the first CAD element comprises a first CAD model that is included in the plurality of CAD models.

3. The computer-implemented method of claim 1, wherein the data model comprises a plurality of entries, and the first data element comprises a component entry that is included in the plurality of entries and indicates data corresponding to a CAD model.

4. The computer-implemented method of claim 1, wherein the topological model includes the first node and a first edge, the set of CAD elements includes a first CAD model and a first relationship between at least two CAD models, and the data model includes a first component entry and a first connection entry.

5. The computer-implemented method of claim 4, wherein the first node corresponds to both the first CAD element and the first component entry and the first edge corresponds to both the first relationship between at least two CAD models and the first connection entry.

6. The computer-implemented method of claim 1, further comprising:
   modifying the topological model to include the first mapping; and
   modifying the topological model to include the data model.

7. The computer-implemented method of claim 6, wherein modifying the topological model to include the data model comprises modifying each topological element included in the topological model to include the corresponding data element included in the data model.

8. The computer-implemented method of claim 1, wherein the first mapping includes a second mapping between the topological model and the CAD assembly and a third mapping between the topological model and the data model.

9. The computer-implemented method of claim 1, further comprising:
   based on the topological model, identifying a second CAD element that is coupled to the first CAD element and is derived from the set of CAD elements; and
   based on the first mapping, generating a user interface element that includes the second CAD element and a second data element that is derived from the set of data elements.

10. A non-transitory computer-readable medium storing program instructions that, when executed by a processor, cause the processor to analyze computer-aided design (CAD) assemblies by performing the steps of:
  generating a first mapping that maps each topological element included in a topological model of a CAD assembly to a corresponding CAD element included in a set of CAD elements included in the CAD assembly and a corresponding data element included in a set of data elements included in a data model, wherein the topological model comprises a graph representation of the CAD assembly, the topological model including a set of nodes, wherein each node included in the topological model corresponds to both a CAD element included in the CAD assembly and a data element included in the data model;
  receiving a first selection of a first node included in the topological model; and
  in response to receiving the first selection of the first node, performing the steps of:
    determining a first CAD element included in the CAD assembly that corresponds to the first node based on the first mapping;
    displaying the first CAD element in a user interface;
    determining a first data element included in the data model that corresponds to the first node based on the first mapping; and
    displaying the first data element in the user interface.

11. The non-transitory computer-readable medium of claim 10, wherein the CAD assembly comprises a plurality of CAD models, and the first CAD element comprises a first CAD model that is included in the plurality of CAD models.

12. The non-transitory computer-readable medium of claim 10, wherein the data model comprises a plurality of entries, and the first data element comprises a component entry that is included in the plurality of entries and indicates data corresponding to a CAD model.

13. The non-transitory computer-readable medium of claim 10, wherein the topological model includes the first node and a first edge, the set of CAD elements includes a first CAD model and a first relationship between at least two CAD models, and the data model includes a first component entry and a first connection entry.

14. The non-transitory computer-readable medium of claim 13, wherein the first node corresponds to both the first CAD element and the first component entry and the first edge corresponds to both the first relationship between at least two CAD models and the first connection entry.

15. The non-transitory computer-readable medium of claim 10, wherein the first CAD element and a second CAD element are included within a CAD sub-assembly that resides within the CAD assembly.

16. The non-transitory computer-readable medium of claim 10, further comprising the step of performing a first operation involving the first CAD element in response to the first selection.

17. The non-transitory computer-readable medium of claim 16, wherein the first operation comprises at least one of simulating the first CAD element, generating alternative geometry for the first CAD element, and determining at least one critical load pathway associated with the first CAD element.

18. A system, comprising:
  a memory storing a software application; and
  a processor that, when executing the software application, is configured to perform the steps of:
    generating a first mapping that maps each topological element included in a topological model of a CAD assembly to a corresponding CAD element included in a set of CAD elements included in the CAD assembly and a corresponding data element included in a set of data elements included in a data model, wherein the topological model comprises a graph representation of the CAD assembly, the topological model including a set of nodes, wherein each node included in the topological model corresponds to both a CAD element included in the CAD assembly and a data element included in the data model,
    receiving a first selection of a first node included in the topological model, and
    in response to receiving the first selection of the first node, performing the steps of:
      determining a first CAD element included in the CAD assembly that corresponds to the first node based on the first mapping,
      displaying the first CAD element in a user interface,
      determining a first data element included in the data model that corresponds to the first node based on the first mapping, and
      displaying the first data element in the user interface.

19. The computer-implemented method of claim 1, wherein the topological model further includes a set of edges that couple the set of nodes, the method further comprising traversing the topological model across one or more edges of the topological model to determine a second node that is connected to the first node.

20. The computer-implemented method of claim 19, further comprising:
  determining a second CAD element included in the CAD assembly that corresponds to the second node based on the first mapping;
  displaying the second CAD element in the user interface;
  determining a second data element included in the data model that corresponds to the second node based on the first mapping; and
  displaying the second data element in the user interface.

* * * * *